(12) United States Patent
Matsumoto (10) Patent No.: US 6,597,588 B2
(45) Date of Patent: Jul. 22, 2003

(54) INSULATING-TYPE SWITCHING ELECTRIC POWER SOURCE DEVICE

(75) Inventor: Tadahiko Matsumoto, Yokohama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/212,262

(22) Filed: Aug. 6, 2002

(65) Prior Publication Data
US 2003/0035306 A1 Feb. 20, 2003

(30) Foreign Application Priority Data
Aug. 10, 2001 (JP) ..................... 2001-243991
Jun. 11, 2002 (JP) ..................... 2002-170060

(51) Int. Cl.$^7$ ............................. H02M 3/335
(52) U.S. Cl. ................ 363/21.08; 363/21.16; 323/907
(58) Field of Search .............. 363/21.08, 21.16; 323/907

(56) References Cited

U.S. PATENT DOCUMENTS 6,314,005 B1 * 11/2001 Nishi et al. ............. 363/21.08
6,459,594 B1 * 10/2002 Tsuji et al. ............. 363/21.08

FOREIGN PATENT DOCUMENTS

JP 5-153775 6/1993 ............ H02M/3/28

* cited by examiner

Primary Examiner—Bao Q. Vu
(74) Attorney, Agent, or Firm—Keating & Bennett, LLP (57) ABSTRACT

An insulating-type switching electric power source device has an input voltage Vin of a primary side that is converted at an input/output ratio determined by switching operations of a switching device, and then is output. Voltage subjected to rectifying and smoothing by a primary-side rectification smoothing circuit is used as detecting signals of the output voltage, to control the time ratio of the switching device. A load regulation correcting circuit outputs load regulation correcting signals correlated with the amount of output current. A temperature compensating circuit corrects the load regulation correcting signals according to the ambient temperature. The load regulation correcting signals correct the output voltage detecting signals according to the fluctuations of the output voltage according to fluctuations in the output current and fluctuations in the ambient temperature. As a result, fluctuations in the output voltage caused by fluctuations in the output current and fluctuations in the ambient temperature are compensated for.

6 Claims, 11 Drawing Sheets

INSULATING-TYPE SWITCHING ELECTRIC POWER SOURCE DEVICE

BACKGROUND OF THE INVENTION

1. Field of the Invention

The present invention relates to an insulating-type switching electric power source device having a DC-DC converter.

2. Description of the Related Art

Figure 11:
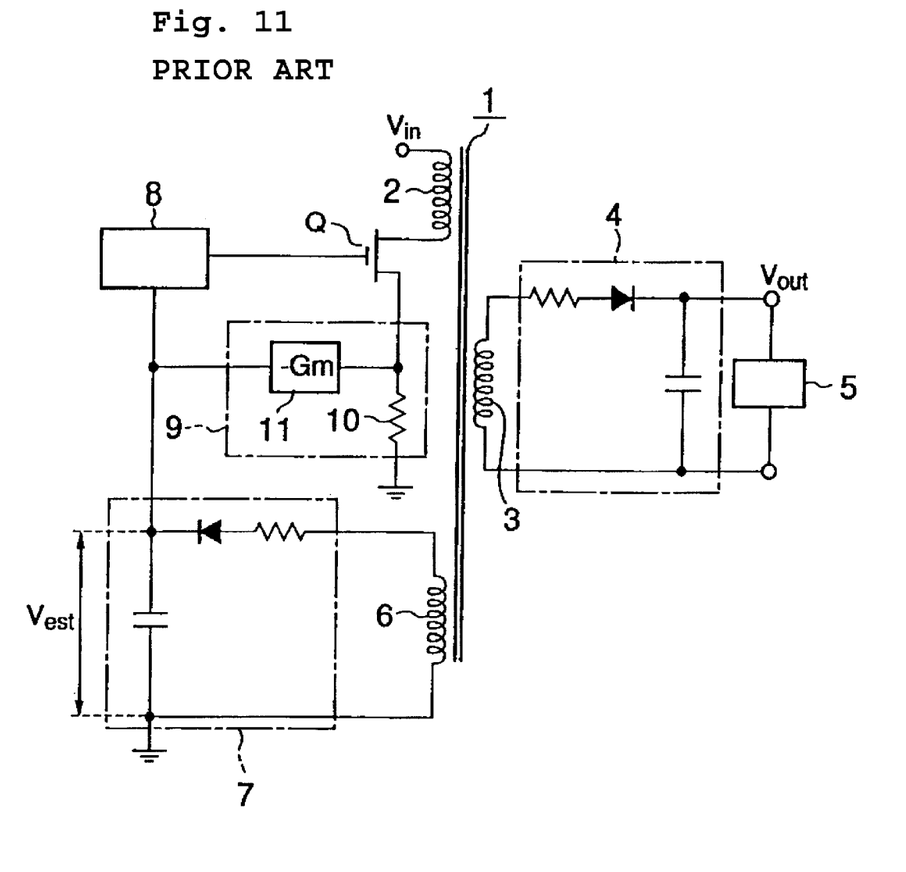
FIG. 11 is a circuit diagram illustrating a proposed example for a switching electric power source device.

FIG. 11 illustrates an example of an insulating-type switching electric power source device. The circuit shown in FIG. 11 is disclosed in Japanese Unexamined Patent Application Publication No. 5-153775, and defines an insulating-type fly-back converter. This fly-back converter has a transformer 1, with a switch device Q being provided at the primary side (primary coil 2 side) of the transformer 1, and a secondary-side rectification smoothing circuit 4 being provided at the secondary side (secondary coil 3 side) of the transformer 1.

At the fly-back converter, input voltage Vin at the primary side is subjected to voltage conversion based on the switching operation of the switch device Q, and voltage induced by the secondary coil 3 of the transformer 1 is subjected to rectification smoothing by the secondary-side rectification smoothing circuit 4 and is supplied to a load 5. The ratio between the voltage Vout output to the load 5 and the input voltage Vin to the primary side (i.e., the input/output conversion ratio) can be carried by controlling the time ratio of the switch device Q. Accordingly, a configuration is provided for controlling the time ratio of the switch device Q, so as to stabilize the output voltage Vout to the load 5. That is to say, an auxiliary coil 6, primary-side rectification smoothing circuit 7, control circuit 8, and load regulation correcting circuit 9, are disposed at the primary side of the transformer 1.

The primary-side rectification smoothing circuit 7 is connected to the auxiliary coil 6, for performing rectification smoothing of the voltage inducted by the auxiliary coil 6, and has a circuit configuration which is approximately the same as that of the secondary-side rectification smoothing circuit 4. The voltage Vest which has been subjected to rectification smoothing by the primary-side rectification smoothing circuit 7 corresponds to the output voltage Vout.

The control circuit 8 uses the rectification smoothing voltage Vest by the primary-side rectification smoothing circuit 7 as detection signals of the output voltage Vout (i.e., output voltage detection signals), and controls the time ratio of the switch device Q so as to stabilize the output voltage Vout. That is to say, indirect control for indirectly stabilizing the output voltage Vout is performed by controlling the voltage wherein the output of the coil 6 provided to the primary side of the transformer 1 has been subjected to rectification smoothing.

The output voltage Vout fluctuates due to fluctuation in the current flowing through the secondary side circuits (i.e., the secondary coil 3 or secondary-side rectification smoothing circuit 4), but the fluctuation of the output voltage Vout due to the current fluctuation at the secondary side (i.e., output current fluctuation) is not manifested in the rectification smoothing voltage Vest of the primary-side rectification smoothing circuit 7. Accordingly, in the event that the rectification smoothed voltage Vest is used as output voltage detecting signals without change to perform switching control of the switch device Q, there is no compensation made for the fluctuations of the output voltage Vout due to the fluctuations in output current. Accordingly, the load regulation correcting circuit 9 is provided in the example, in order to compensate for the fluctuations in the output voltage Vout due to the output current fluctuations.

This load regulation correcting circuit 9 includes a resistor 10 and a load regulation correcting signal creating unit 11. A portion is provided on the primary side for conducting a current correlated with the output current, and the resistor 10 is introduced in such a portion. Accordingly, voltage correlated with the output current is generated at this resistor 10.

The load regulation correcting signal creating unit 11 creates load regulation correcting signals based on the voltage of the resistor 10. The load regulation correcting signals correspond to the output current, and are applied to the output voltage detecting signals Vest output from the primary-side rectification smoothing circuit 7. Accordingly, the output voltage detecting signals Vest are corrected according to fluctuations of the output voltage Vout due to output current fluctuations.

The control circuit 8 performs time ratio control for the switch device Q using the corrected output voltage detecting signals Vest, and accordingly can also compensate for fluctuations in the output voltage Vout due to output current fluctuations, thereby increasing output voltage precision.

Now, the resistance values of the secondary coil 3 of the transformer 1 and the resistance values of the lines of the circuit at the secondary side and so forth fluctuate according to fluctuations in the ambient temperature. Accordingly, even in the event that the flow of the current being conducted through the secondary side circuit is the same, the amount of voltage drop at the secondary side circuit changes due to fluctuations in the ambient temperature. Accordingly, load regulation properties such as indicated by the solid line A in FIG. 3A under a low temperature environment change so the inclination of the load regulation properties are such as indicated by the dotted line B in FIG. 3B under a high temperature environment, and the output voltage Vout also changes.

However, with the circuit configuration shown in FIG. 11, the load regulation correction amount by the load regulation correcting circuit 9 does not change according to the ambient temperature. Accordingly, fluctuations in the load regulation properties due to fluctuations in the ambient temperature cannot be compensated for, leading to problems such as deterioration in output voltage precision and so forth. Further, the inclination of the load regulation properties is greater under high temperature environments, and is smaller under low temperature environments, so there has been a problem in that current balance cannot be maintained under parallel operations.

SUMMARY OF THE INVENTION

In order to overcome the problems described above, preferred embodiments of the present invention provide an insulating-type switching electric power source device wherein compensation can be made for fluctuations in load regulation due to fluctuations in ambient temperature, output voltage precision is excellent, and current balance is readily achieved in parallel operations at all times, regardless of the fluctuations in the ambient temperature.

To this end, an insulating-type switching electric power source device according to a preferred embodiment of the present invention includes a transformer having a primary side and a secondary side, a switch device provided at the primary side of the transformer, converting input voltage of the primary side of the transformer to output voltage of the secondary side of the transformer, a primary side rectification smoothing circuit provided at the primary side of the transformer, performing rectification smoothing of the voltage of a coil of the transformer, a control circuit for using the voltage subjected to rectification smoothing as detection signals of output voltage, and controlling the time ratio of the switch device so as to stabilize the output voltage, a load regulation correcting circuit detecting current correlated with output current by a current detecting device provided in a circuit at the primary side, generating load regulation correcting signals having a correlation with output current from the detected current, and correcting detection signals of the output voltage, according to output voltage fluctuations due to output current fluctuations, and a temperature compensating circuit for changing the amount of load regulation correction by the load regulation correcting circuit according to the fluctuations in the ambient temperature, so as to reduce the amount of load regulation correction under low-temperature environments, and to increase the amount of load regulation correction under high-temperature environments.

With preferred embodiments of the present invention, the detecting signals of output voltage are corrected by load regulation correcting signals output from the load regulation correcting circuit, according to fluctuations in output voltage due to fluctuations in output current. Moreover, a temperature compensating circuit for the amount of load regulation correction is provided thereto, so the detecting signals of the output voltage are also corrected according to fluctuations in load regulation due to fluctuations in the ambient temperature.

Accordingly, the control circuit performs time ratio control for the switch device using detecting signals of output voltage following the correction, so the output voltage precision can be improved.

Other features, elements, characteristics and advantages of the present invention will become more apparent from the following detailed description of preferred embodiments thereof with reference to the attached drawings.

DETAILED DESCRIPTION OF PREFERRED EMBODIMENTS

The following is a description of preferred embodiments of the present invention, with reference to the drawings.

Figure 1:
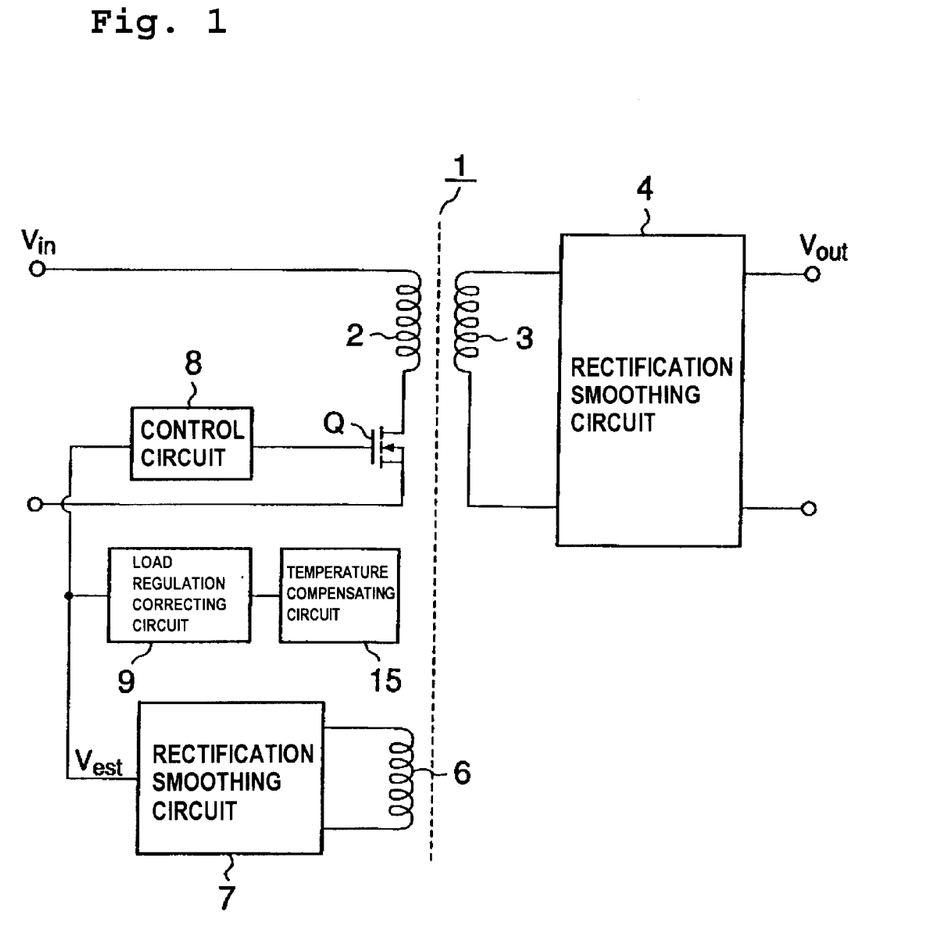
FIG. 1 is a circuit diagram illustrating an example of the switching electric power source device according to a preferred embodiment of the present invention, in a simplified manner.

FIG. 1 is a simplified illustration of the primary elements of an insulating-type switching electric power source device according to a first preferred embodiment of the present invention. Note that in the description of this first preferred embodiment, elements which are the same as or equivalent to those in the above-described proposed example will be denoted with the same reference numerals, and redundant description of the common elements will be omitted.

The switching electric power source device according to the first preferred embodiment preferably includes a switch device Q (e.g., a MOS-FET), a transformer 1, a secondary-side rectification smoothing circuit 4, a primary-side rectification smoothing circuit 7, a control circuit 8, and a load regulation correcting circuit 9, and further includes a temperature compensating circuit 15 which is unique to this arrangement.

With this first preferred embodiment, the temperature compensating circuit 15 has a circuit configuration wherein the magnitude of load regulation correcting signals output from the load regulation correcting circuit 9 are changed variably according to the ambient temperature. The amount of correction of the output voltage detecting signals Vest from the load regulation correcting signals are changed variably according to the ambient temperature due to this temperature compensating circuit 15, so the amount of load regulation correction is variably changed. That is to say, the temperature compensating circuit 15 has a circuit configuration for performing temperature compensation with regard to the output voltage detecting signals Vest, according to the ambient temperature.

Figure 2:
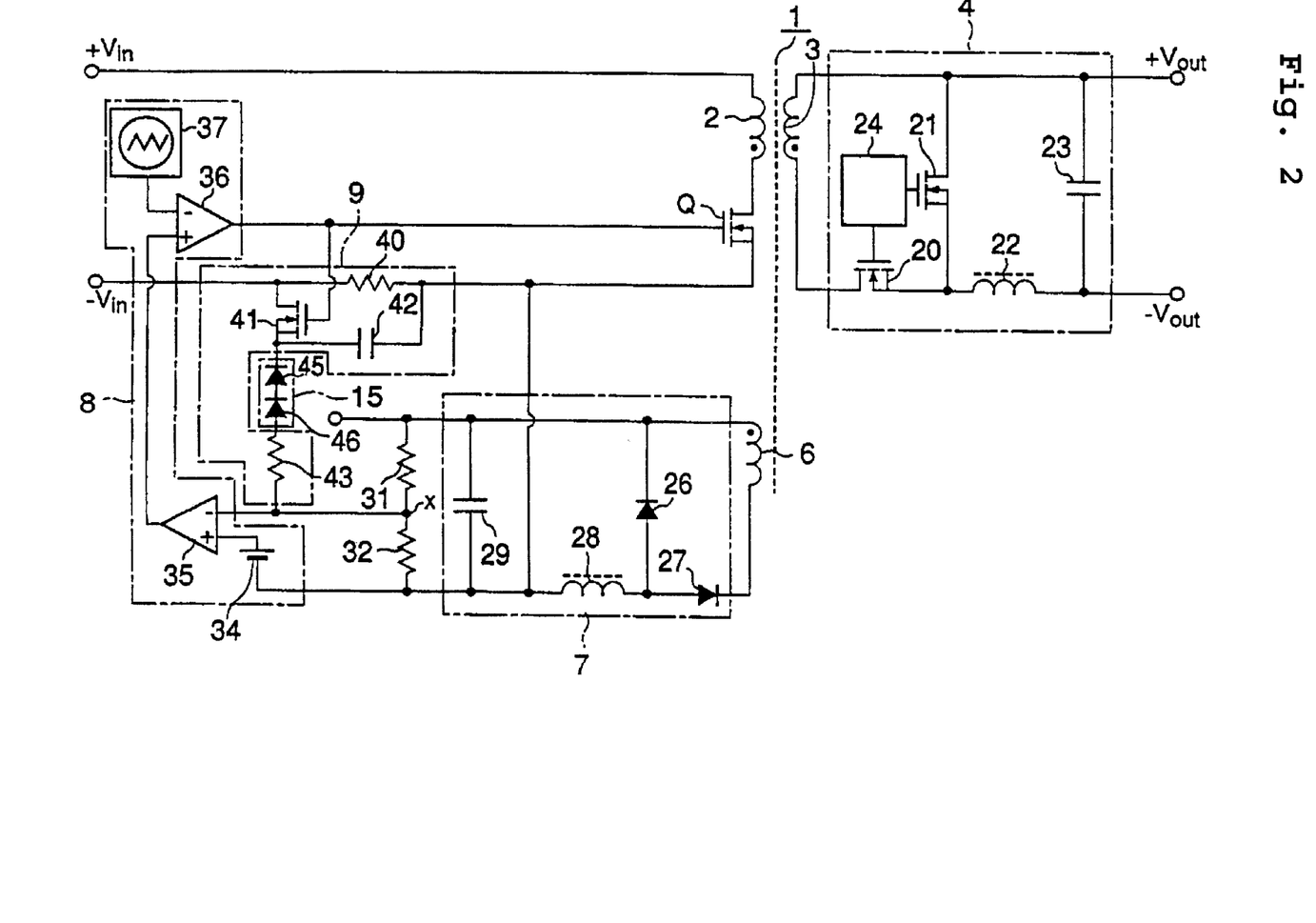
FIG. 2 is a circuit diagram illustrating a specific example of the switching electric power source device according to a preferred embodiment of the present invention.

FIG. 2 shows a specific example of a switching electric power source device including this temperature compensating circuit 15. The circuit shown in FIG. 2 configures an insulating-type forward converter. In this specific example, the secondary-side rectification smoothing circuit 4 comprises MOS-FETs 20 and 21 which are synchronous rectifiers, a choke coil 22, a smoothing capacitor 23, and a synchronous rectifier driving unit 24. The synchronous rectifier driving unit 24 has a circuit configuration for operating synchronously with the switching operations of the switch device Q so as to perform driving control of the MOS-FETs 20 and 21. There are various types of circuit configurations which can be used for the circuit configuration of the synchronous rectifier driving unit 24, any of which may be used for this specific example, so description of the circuit configuration will be omitted.

At the secondary-side rectification smoothing circuit 4, induction voltage of the secondary coil 3 is rectified by the operations of the MOS-FETs 20 and 21 based on the synchronous rectifier driving unit 24, and the choke coil 22. This is then smoothed by the smoothing capacitor 23, and the rectified-smoothed voltage is supplied to the load as output voltage Vout.

The primary-side rectification smoothing circuit 7 includes diodes 26 and 27, a choke coil 28, and a smoothing capacitor 29. At the primary-side rectification smoothing circuit 7, the voltage inducted at the auxiliary coil 6 is rectified by the diodes 26 and 27 and the choke coil 28, and further is smoothed by the smoothing capacitor 29. The voltage of the smoothing capacitor 29 corresponds to the output voltage Vout.

In this specific example, a serial resistor connection unit including voltage dividing resistors 31 and 32 is connected in parallel to the smoothing capacitor 29, with the connecting portion X of the voltage dividing resistors 31 and 32 being connected to the control circuit 8. That is to say, the divided voltage of the smoothing capacitor 29 is divided by the voltage dividing resistors 31 and 32, and the divided voltage signals are applied to the control circuit 8 as output voltage detecting signals Vest.

The control circuit 8 includes a reference voltage source 34, an error amplifier 35, a comparator 36, and a triangular wave oscillator 37. This control circuit 8 has a configuration for controlling the time ratio of the switch device Q based on the output voltage detecting signals Vest applied from the primary-side rectification smoothing circuit 7 side. That is to say, pulse width control (control of switch-on time) of the switch device Q is performed by the control signals of switch driving applied from this control circuit 8 to the switch device Q.

The load regulation correcting circuit 9 includes a resistor 40 and switch device 41 and capacitor 42 and resistor 43, and the temperature compensating circuit 15 includes diodes 45 and 46.

The load regulation correcting circuit 9 is arranged to generate load regulation correcting signals having a correlation with the amount of the output current. The resistor 40 of the load regulation correcting circuit 9 is provided at the portion where current corresponding to the amount of output current is conducted at the primary side, and indirectly detects output current. That is to say, with this specific example, the resistor 40 is introduced between the source side of the switch device Q and the input unit −Vin, so that voltage corresponding to the amount of output current is generated to the resistor 40 in the form of pulses during the on period of the switch device Q. That is, this resistor 40 functions as a switching current detecting device for detecting the current of a switching group correlated with output current.

The drain side of the switch device 41 is connected between this resistor 40 and the input unit −Vin, the source side of the switch device 41 is connected to one end of the capacitor 42, and the other end of the capacitor 42 is connected between the resistor 40 and the source side of the switch device Q. The gate of the switch device 41 is connected to the output side of the control circuit 8. Accordingly, signals which are the same as the control signals of switch driving applied from the control circuit 8 to the switch device Q are also applied to the gate side of the switch device 41, and accordingly, the switching operations of the switch device 41 are synchronous with the switching operations of the switch device Q. Due to the switching operations of the switch device 41, the switch device 41 functions as a synchronous rectifier, and peak charging of the voltage of the resistor 40 is performed to the capacitor 42. The peak voltage of the resistor 40 corresponds to the amount of output current, so the charging voltage of the capacitor 42 fluctuates proportionately to the fluctuations in output current.

The cathode side of the diode 45 is connected at the connection portion between the source side of the switch device 41 and the capacitor 42. The cathode side of the diode 46 is connected to the anode side of the diode 45, and one end of the resistor 43 is connected to the anode side of the diode 46. The other end of the resistor 43 is connected to the conduction path of the output voltage detecting signals Vest from the primary-side rectification smoothing circuit 7 side to the control circuit 8. That is to say, the capacitor 42 is connected to the conduction path of the output voltage detecting signals Vest via the diodes 45 and 46 and the resistor 43. Accordingly, the charging voltage of the capacitor 42 affects the output voltage detecting signals Vest via the diodes 45 and 46 and the resistor 43, as load regulation correcting signals.

The forward voltage of the diodes 45 and 46 changes due to fluctuations in ambient temperature, so the load regulation correcting signals which affect the output voltage detecting signals Vest not only fluctuate proportionately according to the fluctuations in the output current, but also according to fluctuations in the ambient temperature. Accordingly, the output voltage detecting signals vest are corrected by the load regulation correcting signals thereof, according to the fluctuations in the output voltage Vout due to fluctuations in the output current and fluctuations in the ambient temperature.

According to this first preferred embodiment, a load regulation correcting circuit 9 and temperature compensating circuit 15 are provided in a configuration wherein switching control of a switch device Q is performed using voltage output from the primary-side rectification smoothing circuit 7 as output voltage detecting signals Vest. Accordingly, the output voltage detecting signals Vest output from the primary-side rectification smoothing circuit 7 can be corrected according to fluctuations in the output current and fluctuations in the output voltage Vout due to fluctuations in the ambient temperature. Thus, fluctuations in the output voltage Vout due to fluctuations in the output current, and fluctuations in the inclination of the load regulation due to fluctuations in the ambient temperature, can be compensated for by the control circuit 8 performing time ratio (pulse-width) control of the switch device Q based on the corrected output voltage detecting signals Vest.

Accordingly, even in the event of a switching electric power source device wherein the output voltage Vout is small, the output voltage precision thereof is still improved.

Figure 3A:
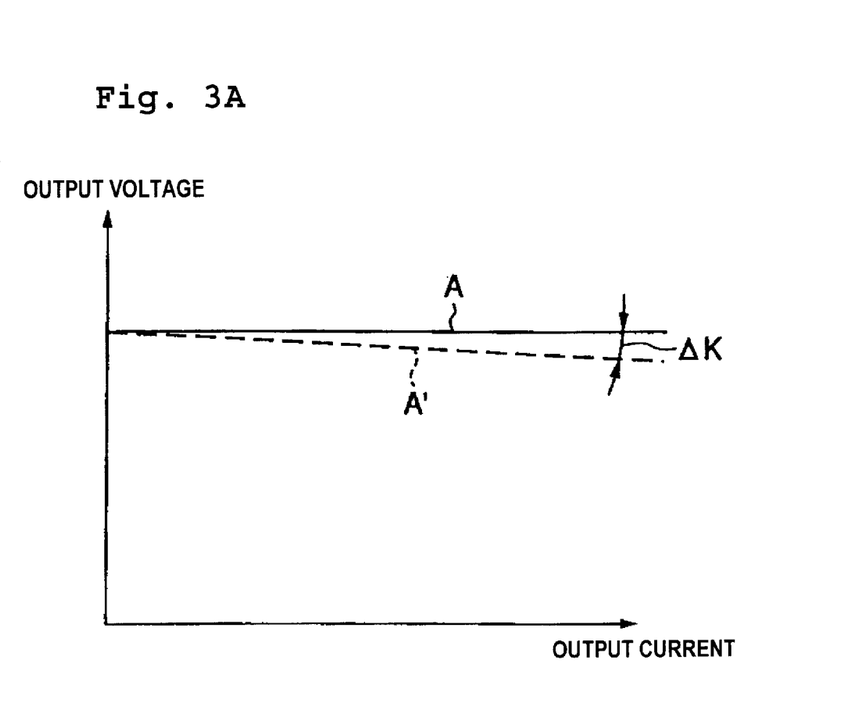
FIGS. 3A and 3B are diagrams for describing the advantages of the preferred embodiment of the present invention shown in FIG. 2.

Now, in the event that the load regulation correcting circuit 9 and the temperature compensating circuit 15 are not provided, the switching electric power source device has load regulation properties with a small inclination such as indicated by the dotted line A' in FIG. 3A in the event that the ambient temperature is low, and the fluctuations in the output voltage Vout due to the fluctuations in the output current are small. Conversely, in the event that the ambient temperature is high, the switching electric power source device has load regulation properties with a great inclination such as indicated by the dotted line B' in FIG. 3B, and the fluctuations in the output voltage Vout due to the fluctuations in the output current are great.

Figure 3B:
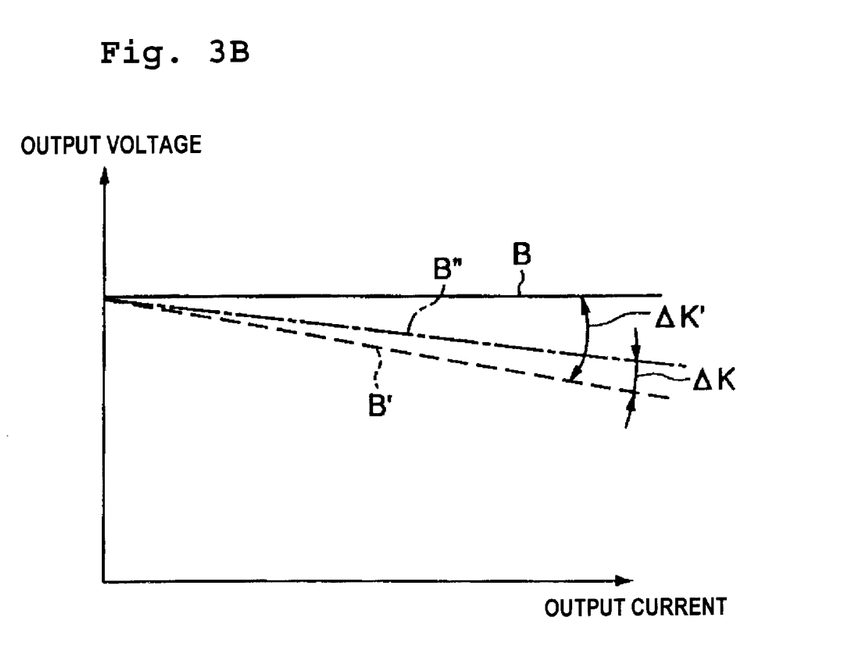

For example, let us say that a load regulation correcting circuit 9 is provided to compensate for the output voltage Vout due to the fluctuations in the output current, and circuit constants are set for the load regulation correcting circuit 9 so as to have load regulation properties with hardly any inclination, as indicated by the solid line A in FIG. 3A, the load regulation properties correction amount ΔK due to the load regulation correcting circuit 9 are the same regardless of the ambient temperature, so in the event that the ambient temperature is high, there will be load regulation properties such as indicated by the dotted line B" shown in FIG. 3B. Accordingly, there will be fluctuations of the output voltage Vout due to fluctuations of the output current under high-temperature environments, and satisfactory results cannot be obtained.

Conversely, in the event that the circuit constants are set for the load regulation correcting circuit 9 so as to have load regulation properties with hardly any inclination, based on a state with high ambient temperature, as indicated by the solid line B in FIG. 3B, inverse history load regulation properties are had in the event that the ambient temperature is low, wherein the output voltage Vout increases following the increase in output current.

With this first preferred embodiment, the temperature compensating circuit 15 for the amount of load regulation correction is provided as well as the load regulation correcting circuit 9, so the load regulation properties correction amount ΔK may be varied according to the ambient temperature. That is, the amount of correction of the load regulation properties may be made to be ΔK under low-temperature environments, and the amount of correction of the load regulation properties may be made to be ΔK', which is greater than ΔK, under high-temperature environments. Accordingly, changes in the inclination of the load regulation properties due to fluctuations in the ambient temperature are prevented and minimized. Thus, the precision of the output voltage Vout is greatly improved.

Now, in the event that MOS-FETs which are synchronous rectifiers are used in the secondary-side rectification smoothing circuit 4, the change in equivalent resistance of the secondary-side circuit due to fluctuations in ambient temperature is greater as compared to cases using diodes for rectification.

The reason is that, while the forward voltage of diodes grows smaller as the ambient temperature rises, the resistance component of MOS-FETs increases as the ambient temperature rises. Accordingly, using MOS-FETs for the secondary-side rectification smoothing circuit 4 means that almost all of the components of the secondary-side rectification smoothing circuit 4 have higher resistance components in accordance with rising ambient temperatures. Thus, in the event of using MOS-FETs for the secondary-side rectification smoothing circuit 4, the change in equivalent resistance of the secondary-side circuit due to fluctuations in ambient temperature is greater as compared to cases using diodes for rectification. Due to this, the change in inclination of the load regulation owing to fluctuations in the ambient temperature is great in the event of using MOS-FETs for the secondary-side rectification smoothing circuit 4. Accordingly, in the event of using MOS-FETs for the secondary-side rectification smoothing circuit 4, using a temperature compensating circuit 15 for the amount of load regulation correction, such as illustrated with the first preferred embodiment, is extremely effective.

Figure 4:
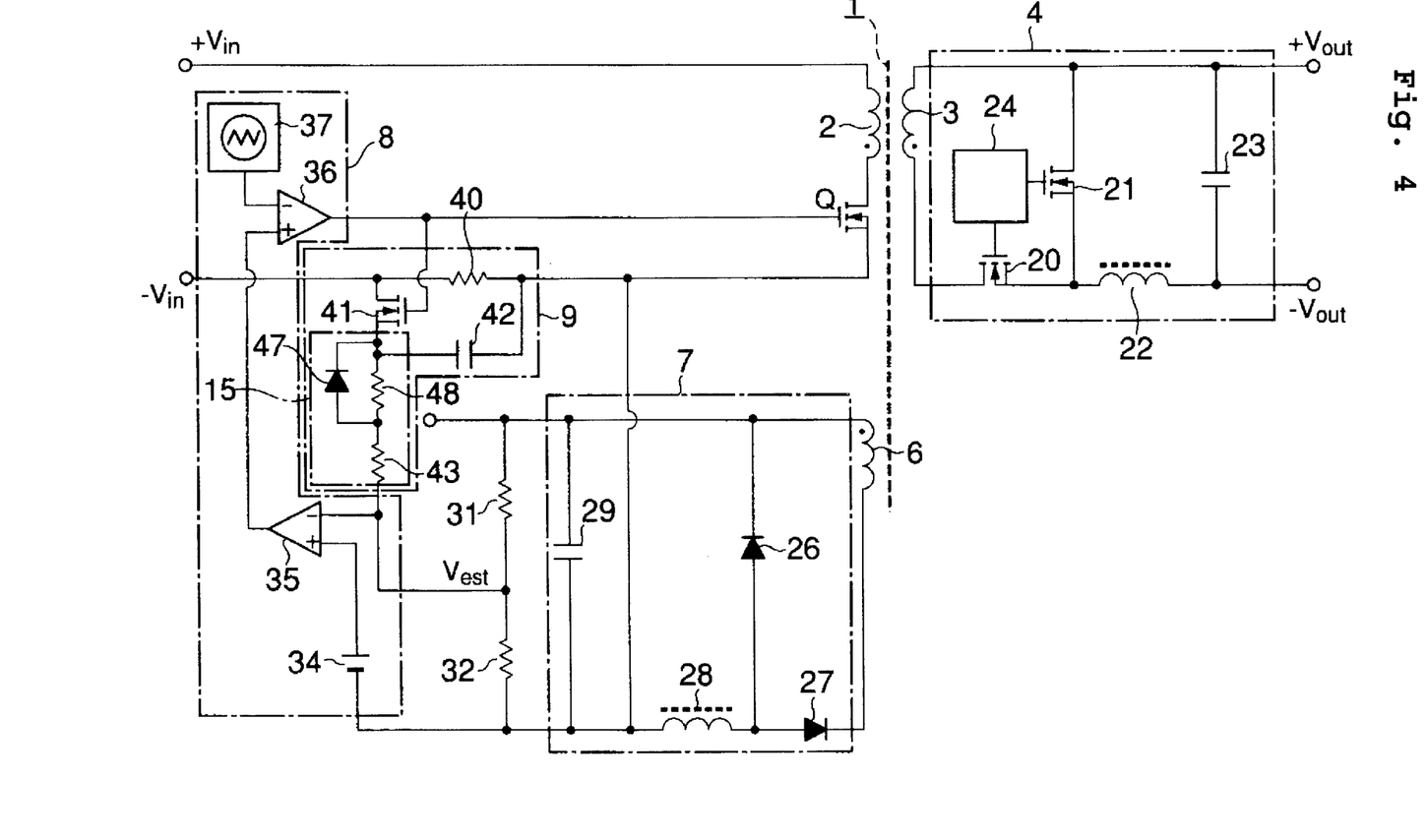
FIG. 4 is a circuit diagram illustrating the switching electric power source device according to another preferred embodiment of the present invention.

Next, the second preferred embodiment of the present invention will be described. A different specific example of the temperature compensating circuit 15 will be described in the second preferred embodiment. The switching electric power source device according to the second preferred embodiment has a circuit configuration such as shown in FIG. 4, and has approximately the same circuit configuration as the circuit configuration shown in FIG. 2, except for the temperature compensating circuit 15. Note that in the description of this second preferred embodiment, elements that are the same as or equivalent to those in the first preferred embodiment will be denoted with the same reference numerals, and redundant description of the common elements will be omitted.

That is, with this second preferred embodiment, a temperature compensating circuit 15 including a resistor 43 and diode 47 and resistor 48 is provided, as shown in FIG. 4 instead of the temperature compensating circuit 15 comprising the diodes 45 and 46 shown in FIG. 2.

With this second preferred embodiment, the resistor 43 and the resistor 48 of the temperature compensating circuit 15 are connected serially, and the serial resistor connection portion is introduced between the connection portion of the switch device 41 and the capacitor 42, and the conduction path of the output voltage detecting signals Vest extends from the primary-side rectification smoothing circuit 7 to the control circuit 8.

Also, the diode 47 is connected in parallel with the resistor 48 of the serial resistor connection portion, with the cathode side thereof facing the capacitor 42. Thus, the same voltage as the application voltage of the resistor 48 is applied to the diode 47. That is, the operating state of the diode 47 can be determined by the voltage of the resistor 48. Also, upon the ambient temperature dropping, the forward voltage drop $V_F$ of the diode 47 increases, and decreases upon the ambient temperature rising. Thus, the forward current of the diode 47 changes according to fluctuations in the ambient temperature. That is to say, the equivalent resistance values of the diode 47 change according to the fluctuations in the ambient temperature.

With this second preferred embodiment, the diode 47 functions as the temperature sensing unit, using the properties of the diode 47. That is to say, the application voltage of the diode 47 (the application voltage of the resistor 48) is set to a voltage which satisfies the following conditions. The voltage is a voltage which is lower than the forward voltage drop $V_F$ of the diode 47 under low ambient temperatures and conducts practically none of the forward current of the diode 47 in the event that the ambient temperature is low, and which is higher than the forward voltage drop $V_F$ of the diode 47 under high ambient temperatures and conducts the forward current of the diode 47 in the event that the ambient temperature is high. The resistance values of the resistor 48 and resistor 43 are each set so as to apply such a voltage to the resistor 48.

With the second preferred embodiment, the temperature compensating circuit 15 is configured as described above, so in the event that the ambient temperature is low, hardly any current is conducted to the diode 47, and almost all of the current flowing between the capacitor 42 and the conduction path of the output voltage detecting signals Vest (i.e., the load regulation correction signals) is conducted through the resistors 43 and 48. On the other hand, in the event that the ambient temperature is high, the load regulation correction signals hardly flow through the resistor 48 and are conducted to the diode 47. Due to such a change in the conducting path of the load regulation correction signals according to fluctuations in the ambient temperature, the resistance values of the overall temperature compensating circuit 15 are the total resistance values of the resistors 43 and 48 in the event that the ambient temperature is low, while in the event that the ambient temperature is high, the resistance values can be viewed as being only the resistance values of the resistor 43. Due to the fluctuation in resistance values of the entire temperature compensating circuit 15 owing to the fluctuations in the ambient temperature, the load regulation correcting signals flowing through the temperature compensating circuit 15 change according to the ambient temperature.

That is to say, due to the fluctuations in the resistance values of the temperature compensating circuit 15 owing to the fluctuations in the ambient temperature, temperature compensation can be performed in the direction of reducing the amount of correction by the load regulation correcting signals in the event that the ambient temperature is low, and temperature compensation can be performed in the direction of increasing the amount of correction by the load regulation correcting signals in the event that the ambient temperature is high.

The same advantages as those achieved by the first preferred embodiment can be obtained with this second preferred embodiment, as well.

Next, a third preferred embodiment will be described. A different specific example of the temperature compensating circuit 15 will be described in the third preferred embodiment. Note that in the description of this third preferred embodiment, elements which are the same as or equivalent to those in the first and second preferred embodiments will be denoted with the same reference numerals, and redundant description of the common elements will be omitted.

Figure 5:
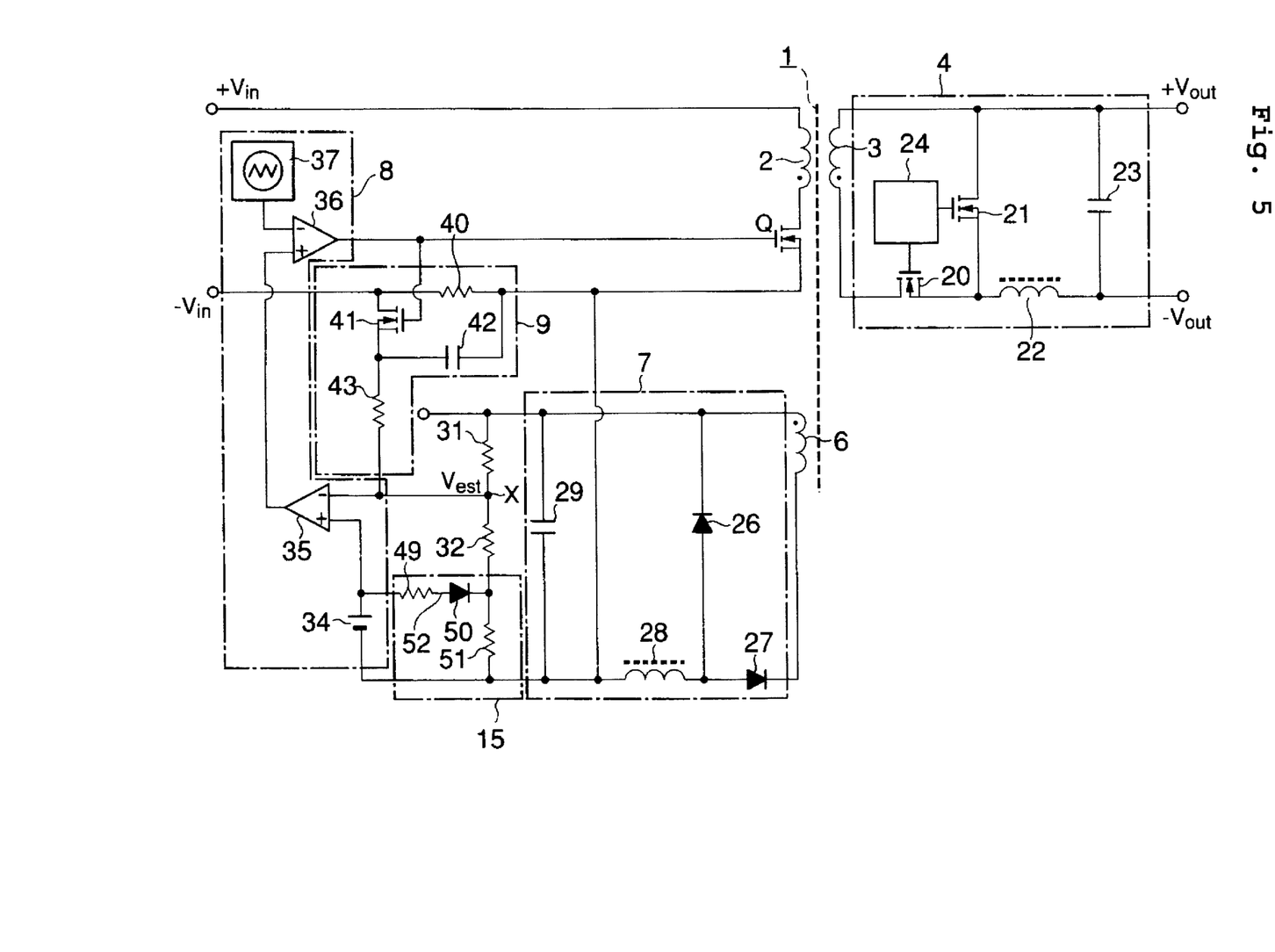
FIG. 5 is a circuit diagram illustrating the switching electric power source device according to another preferred embodiment of the present invention.

The temperature compensating circuit 15 shown in this third preferred embodiment includes a resistor 49, a diode 50, and a resistor 51, as shown in FIG. 5. The resistor 51 is serially connected to the serial connecting portion of the resistors 31 and 32, and the serial connecting portion of the resistors 31, 32, and 51 is connected in parallel with the output side of the primary-side rectification smoothing circuit 7. The output voltage of the primary-side rectification smoothing circuit 7 is divided by the resistors 31, 32, and 51, and the divided voltage Vest is output toward the control circuit 8 as output voltage detecting signals from the connection portion X of the resistors 31 and 32.

Also, connected to a voltage dividing position different to the detecting signals output portion X in this serial connecting portion (the connecting portion of the resistors 32 and 51 in this third preferred embodiment) is a temperature compensating current path 52 for supplying current from a reference voltage source 34 of the control circuit 8. A resistor 49 is introduced in this temperature compensating current path 52, and also a diode 50 is introduced with the cathode side thereof facing the resistor 51 side.

With this third preferred embodiment, the diode 50 functions as the temperature sensing unit. Using the fluctuations in the forward voltage drop $V_F$ of the diode 50 due to the fluctuations in the ambient temperature, the configuration is arranged such that voltage is applied to the diode 50 wherein practically none of the forward current of the diode 50 is conducted in the event that the ambient temperature is low, and the forward current of the diode 50 is conducted in the event that the ambient temperature is high.

Accordingly, in the event that the ambient temperature is low, there is practically no current flowing into the resistor 51 from the reference voltage source 34 via the resistor 49 and diode 50. On the other hand, in the event that the ambient temperature is high, the current from the reference voltage source 34 flows to the resistor 51 via the resistor 49 and diode 50. Accordingly, the amount of conduction of the resistor 51 fluctuates according to the fluctuations in the ambient temperature, and due to this, the amount of conduction of the resistor 32 also changes. That is to say, in the event that the ambient temperature is low, the amount of conduction of the resistor 32 increases, and in the event that the ambient temperature is high, the amount of conduction of the resistor 32 decreases.

Now, the current which has flowed through the resistor 31 is split toward the resistor 32 and toward the path heading toward the control circuit 8. While the amount of current conducted by the resistor 31 hardly fluctuates due to fluctuations in the ambient temperature, the amount of current conducted by the resistor 32 fluctuates due to fluctuations in the ambient temperature, so in accordance with the fluctuations in the amount of current of the resistor 32, the amount of current being diverted from the resistor 31 toward the control circuit 8 side decreases in the event that the ambient temperature is low, and increases in the event that the ambient temperature is high. A portion of the current diverted to the control circuit 8 side from the resistor 31 flows into the load regulation correction circuit 9 via the resistor 43. The amount of current flowing into the load regulation correction circuit 9 fluctuates according to the amount of split current from the resistor 31 (i.e., according to the fluctuations in the ambient temperature). That is to say, temperature compensation is made for the load regulation correcting signals of the load regulation correction circuit 9.

In other words, due to the amount of current being supplied from the reference voltage source 34 to the resistor 51 via the resistor 49 and the diode 50 fluctuating according to fluctuations in the ambient temperature, the voltage dividing ratio of the resistors 31, 32, and 51 change, and accordingly, the output voltage detecting signals Vest applied to the control circuit 8 according to the ambient temperature changes, even though the output voltage of the primary-side rectification smoothing circuit 7 has not changed, for example. That is, temperature compensation is performed for the load regulation correction.

Accordingly, as with the first and second preferred embodiments, the object load regulation properties can be obtained regardless of fluctuations in the ambient temperature.

Figure 6:
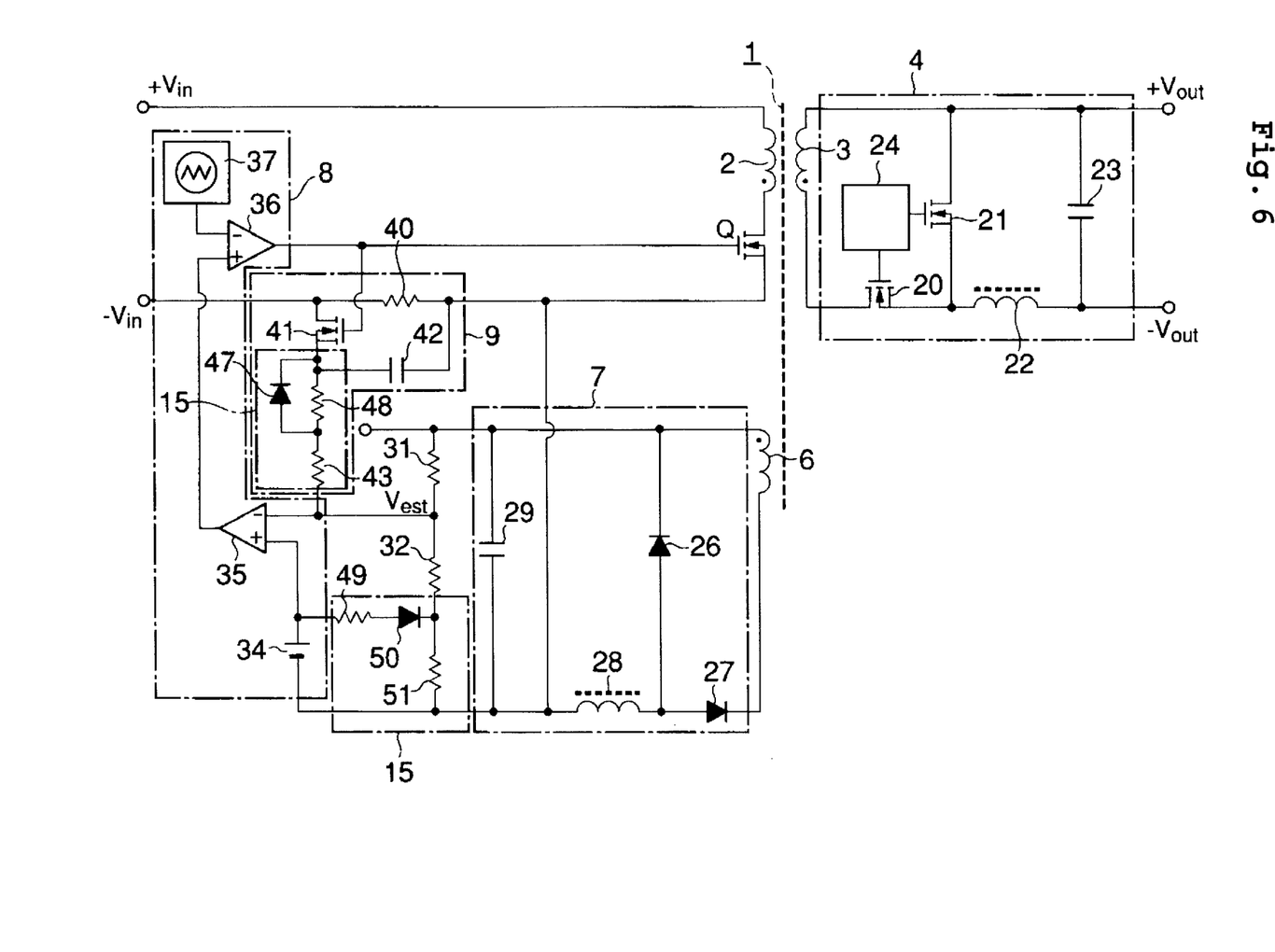
FIG. 6 is a circuit diagram illustrating an example of a switching electric power source device having built in a temperature compensating circuit configured by combining the circuit configurations of the temperature compensating circuits shown in the other preferred embodiments of the present invention.

Now, while specific examples of the temperature compensating circuit 15 have been described in the first through third preferred embodiments, for example, two or more of the three circuit configurations of the temperature compensating circuit 15 shown in the first through third embodiments may be combined to configure a temperature compensating circuit 15. For example, FIG. 6 shows a circuit configuration example of a temperature compensating circuit 15 wherein the temperature compensating circuit 15 according to the second preferred embodiment and the temperature compensating circuit 15 according to the third preferred embodiment have been combined.

Next, a fourth preferred embodiment will be described. Note that in the description of this fourth preferred embodiment, elements which are the same as or equivalent to those in the first through third preferred embodiments will be denoted with the same reference numerals, and redundant description of the common elements will be omitted.

Figure 7A:
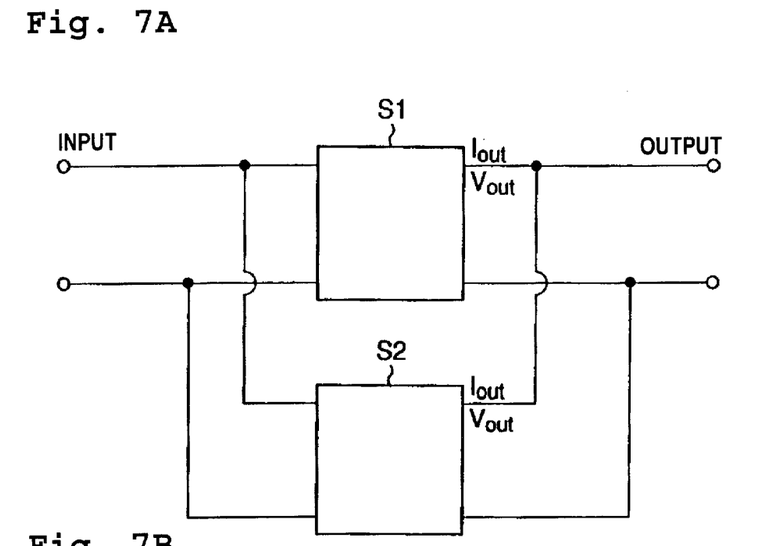
FIGS. 7A through 7C are diagram describing a multi-parallel type switching electric power source device according to a further preferred embodiment of the present invention.

With the fourth preferred embodiment, an example of a multi-parallel type switching electric power source device will be described. With a multi-parallel type switching electric power source device, multiple switching electric power source devices S1 and S2 are arranged in parallel, as shown in FIG. 7A. That is to say, the input sides of the switching electric power source devices S1 and S2 are connected to a common input electric power source (not shown), and also, the output sides of the switching electric power source devices S1 and S2 are connected to a common load (not shown).

One of the novel characteristics of the fourth preferred embodiment is that the multiple switching electric power source devices S1 and S2 each have one of the circuit configurations illustrated in the first through third preferred embodiments. Also, switching electric power source devices S1 and S2 each have the load regulation correcting circuits 9 configured such that load regulation properties with somewhat of an inclination can be achieved, as shown in FIG. 7B.

The reason for having such load regulation properties is as follows. For example, in the event that the switching electric power source devices S1 and S2 are both configured so as to both output the same output voltage Vout, the output current Iout of the switching electric power source devices S1 and S2 is also preferably the same, from the perspective of heat sharing.

Figure 7B:
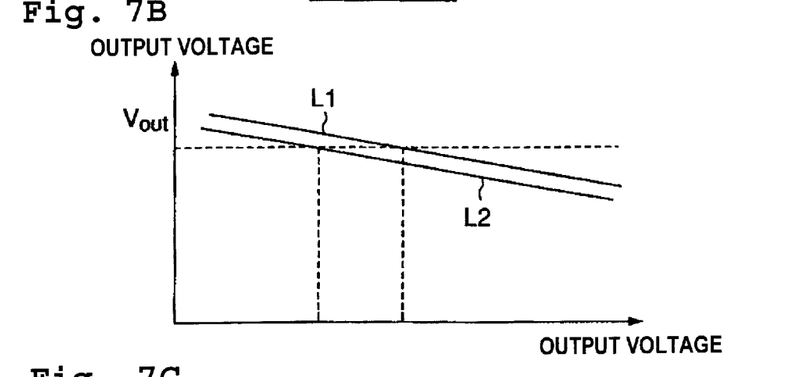
Figure 7C:
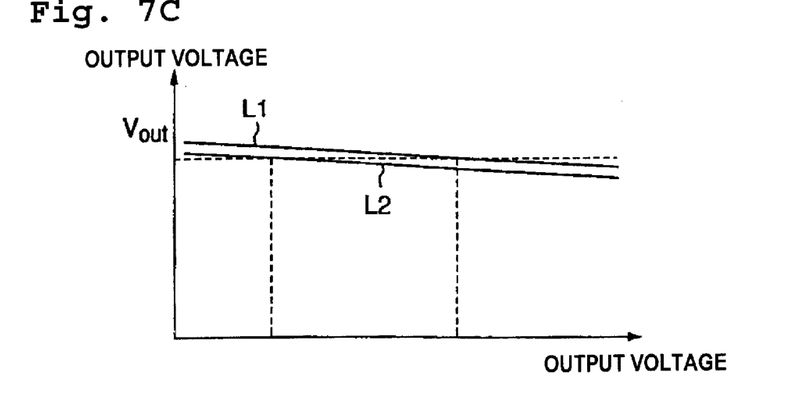

However, the output voltage values of the switching electric power source devices S1 and S2 often differ, as indicated by the load regulation properties L1 and L2 shown in FIG. 7B. In the event that the output voltage values of the switching electric power source devices S1 and S2 differ, and the inclination is extremely small with almost flat load regulation properties as shown in FIG. 7C, the output current Iout of each of the switching electric power source devices S1 and S2 differ greatly one from another. In other words, the current balance becomes poor.

Conversely, with an arrangement wherein the switching electric power source devices S1 and S2 each have load regulation properties with somewhat of an inclination, the difference in the output Iout of the switching electric power source devices S1 and S2 can be minimized to a very low level in the event that the output voltage Vout of the switching electric power source devices S1 and S2 is the same. That is to say, it is easier to attain current balance for the switching electric power source devices S1 and S2.

As a result, with the fourth preferred embodiment, the load regulation correcting circuits of the switching electric power source devices S1 and S2 have configurations so as to output load regulation correcting signals which can have somewhat inclined load regulation properties, rather than outputting load regulation correcting signals for completely compensating for the fluctuations in the output voltage Vout due to fluctuations in the output current.

According to the fourth preferred embodiment, a multi-parallel type switching electric power source device is configured using the switching electric power source devices S1 and S2 according to the first through third preferred embodiments. Accordingly, the switching electric power source devices S1 and S2 have temperature correcting circuits 15 for the load regulation correction amount, so even in the event that the ambient temperature fluctuates, the switching electric power source devices S1 and S2 can have constant load regulation properties which hardly fluctuate at all.

Accordingly, the following problems due to fluctuations in the load regulation properties due to fluctuations in the ambient temperature can be prevented. For example, in the event that the ambient temperature is low and the inclination of the load regulation properties fluctuates in the direction of the inclination being smaller, there is the aforementioned problem of the difficulty of obtaining a current balance for the switching electric power source devices S1 and S2. Conversely, with the fourth preferred embodiment, fluctuations in the load regulation properties due to fluctuations in the ambient temperature can be prevented, so even in the event that the ambient temperature is low, load regulation properties which facilitate current balance can be maintained.

Figure 8:
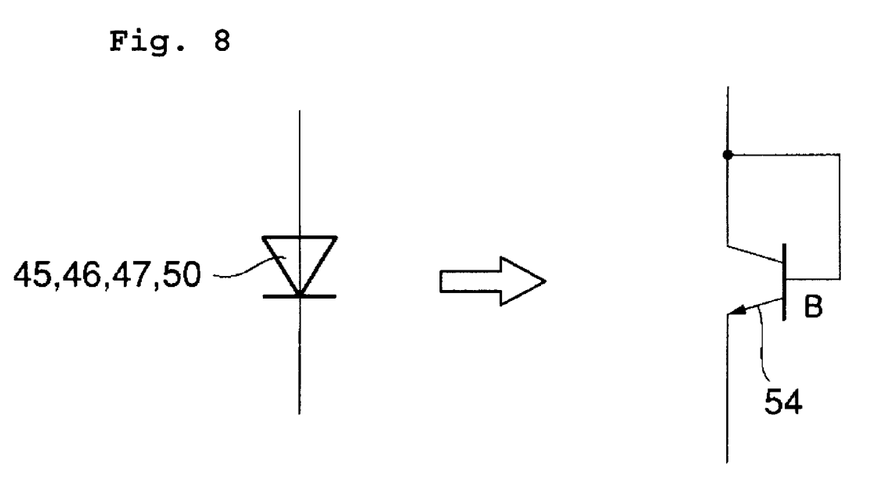
FIG. 8 is a diagram describing another example of the temperature sensing unit of preferred embodiments of the present invention.

It should be noted that the present invention is by no means restricted to the first through fourth preferred embodiments described herein. Rather, a wide variety of embodiments can be assumed from the description of the present invention. For example, with the specific example of the temperature compensating circuit 15 shown in the first through fourth preferred embodiments, diodes 45, 46, 47, and 50 have been provided as temperature sensing units wherein the amount of conducting (equivalent resistance values) changes due to fluctuations in the ambient temperature, but arrangements may be made wherein, instead of the diodes 45, 46, 47, and 50, devices such as thermistors or temperature-sensitive resistors, for example, wherein the resistance values fluctuate due to the fluctuations in the ambient temperature, are provided. Also, as shown in FIG. 8, an arrangement may be made, wherein a transistor device 54 is provided as a temperature sensing unit, instead of the diodes 45, 46, 47, and 50. Also, in the event of providing the transistor device 54, there are various locations for connecting the base of the transistor device 54, with the arrangement shown in FIG. 8 only being one example thereof. The location to which to connect the base thereof may be set as is suitable, taking the circuit configuration into consideration.

Further, the following circuits may be included in any of the preferred embodiments, instead of or in addition to the temperature compensating circuit 15. For example, devices wherein the resistance values increase as the ambient temperature increases (e.g., thermistors, temperature-sensitive resistors, transistor devices, etc.), circuits wherein the amount of current conducted is reduced as the ambient temperature increases, and so forth, may be provided in parallel to the voltage dividing resistor 32. In this case, temperature compensation is performed for the load regulation correction, by directly performing temperature compensation with regard to the output voltage detecting signals Vest according to the fluctuations in the ambient temperature.

Thus, the circuit configuration of the temperature compensating circuit 15 for the load regulation correction is not particularly restricted, so long as correction can be made with regard to the detecting signals of the output voltage, according to fluctuations in the inclination of the load regulation due to fluctuations in the ambient temperature. Further, the circuit configuration of the control circuit 8 is also not restricted to the specific examples shown here. Rather, a wide variety of forms may be assumed. The circuit configuration of the temperature compensating circuit 15 and the displacement position thereof is set as is appropriate, taking the circuit configuration of the control circuit 8 into consideration. Also, in the same way, the circuit configuration of the load regulation correcting circuit 9 is also not restricted to the specific examples shown here, and may be set as desired, taking into configuration the circuit configuration of the control circuit 8, and so forth.

Figure 9A:
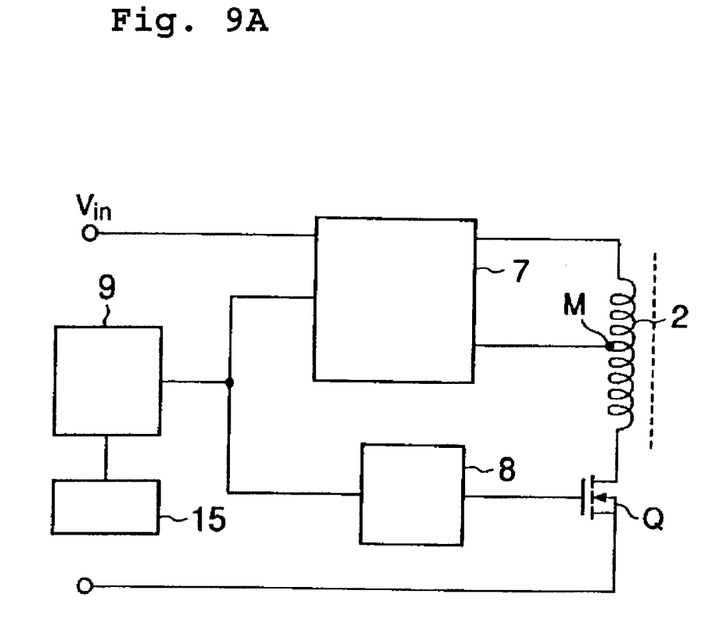
FIGS. 9A and 9B are diagrams describing another preferred embodiment of the present invention.
Figure 9B:
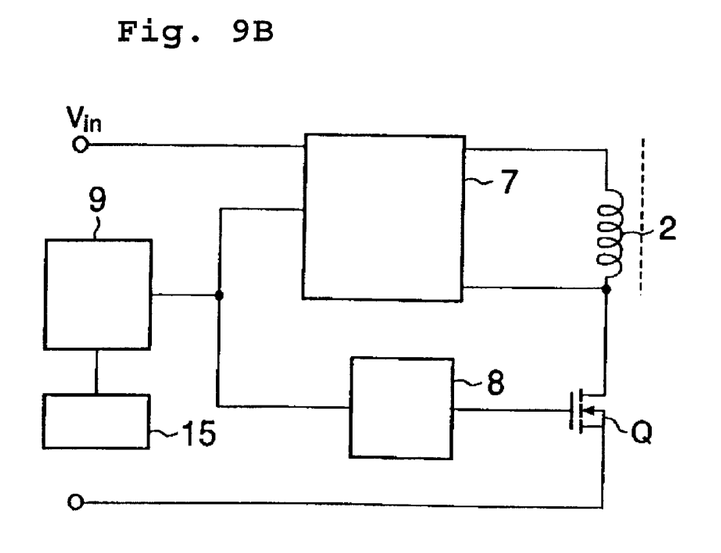

Further, with the first through fourth preferred embodiments, an arrangement has been made wherein an auxiliary coil 6 is provided, the voltage of this auxiliary coil is rectified and smoothed, and the rectified and smoothed voltage is used as the detecting signals of the output voltage Vout to perform time ratio control of the switch device Q, but an arrangement may be made as shown in FIG. 9A, for example, wherein an intermediate tap M is provided to the primary coil 2, with voltage output from here being rectified and smoothed, and the voltage subjected to rectification smoothing being used as indirect detecting signals of the output voltage Vout, so as to perform time ratio control for the switch device Q. Also, an arrangement may be made as shown in FIG. 9B, wherein the voltage of the primary coil 2 is subjected to rectification smoothing, and the voltage subjected to rectification smoothing is used as detecting signals of the output voltage Vout, so as to perform time ratio control for the switch device Q.

Figure 10:
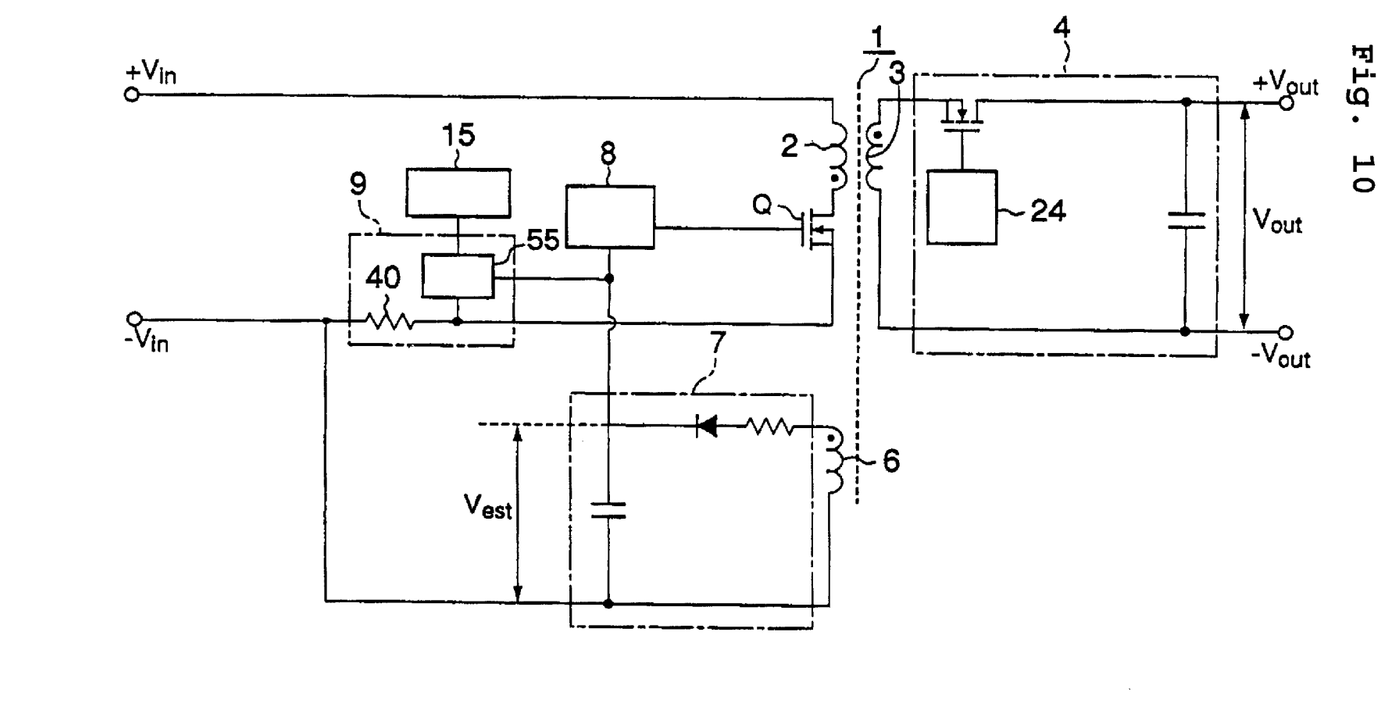
FIG. 10 is a diagram illustrating yet another preferred embodiment of the present invention.

Further, through the insulating-type switching electric power source devices in the specific examples have been described as being a forward type, preferred embodiments of the present invention can be applied to electric power converting types other than forward types, such as fly-back types like that shown in FIG. 10, push-pull types, half-bridge types, full-bridge types, and so forth, as long as the arrangement includes a circuit configuration for performing rectification and smoothing of the voltage of the coil provided to the primary side of the transformer, and for performing time ratio control of a switch device using voltage subjected to rectification smoothing as detecting signals of the output voltage. Note that reference numeral 55 in FIG. 10 denotes a circuit for creating load regulation correcting signals and outputting these, using the voltage signals generated at the resistor 40 (i.e., voltage signals according to the amount of current conducted at the secondary side).

Further, there is an element in the circuit at the primary side circuit through which is conducted a current which is correlated with the output current, and while the preferred embodiments have been described with a resistor 40 being provided at that element defining a current detecting device, a current transformer may be provided as the current detecting device, for example.

Further, with the first through third preferred embodiments, the switching electric power source device has been described with reference to examples having load regulation properties which are almost flat and without hardly any inclination, but switching electric power source devices may be configured to have load regulation properties with somewhat of an incline as with the fourth preferred embodiment, even in cases of the electric power source device being used independently. In this case as well, fluctuations in the load regulation properties due to the fluctuations in the ambient temperature can be prevented, by providing a temperature compensating circuit for the load regulation correction amount, so as to correct the detecting signals of the output voltage applied to the control circuit according to the fluctuations in the ambient temperature. Thus, the inclination of the load regulation does not change due to the ambient temperature, so improvement in output voltage precision, and improvement in the current balance when performing parallel operations, can be achieved.

Further, in the fourth preferred embodiment, an example has been illustrated wherein two switching electric power source devices are connected in parallel, but the number of switching electric power source devices for parallel operations may be three or more, i.e., the number thereof is to be set as appropriate.

According to preferred embodiments of the present invention, a load regulation correcting circuit and a temperature compensating circuit for the load regulation correction amount are provided, with the detecting signals of the output voltage being corrected according to fluctuations in the output current and fluctuations in the temperature of the ambient environment by these circuits. Accordingly, the control circuit performs time ratio control of the switch device so as to stabilize the output voltage, so the fluctuations in the output voltage due to fluctuations in the output current, and fluctuations in the inclination of the load regulation due to fluctuations in the ambient temperature are compensated for, and accordingly, the output voltage can be stabilized in a precise manner. Accordingly, the reliability of the switching electric power source device is greatly improved.

Particularly, in the event of using MOS-FETs which are synchronous rectifiers in a secondary-side rectification smoothing circuit for performing rectification and smoothing of the voltage of the secondary coil of a transformer, fluctuations in the equivalent resistance of the secondary side circuit due to fluctuations in the ambient temperature are great, so using various preferred embodiments of the present invention is extremely effective.

Also, with an arrangement wherein peak charging at a capacitor is performed for voltage of a switching current detecting device for detecting current of a switching loop, and the charged voltage of the capacitor is output as load regulation correcting signals for correcting the detecting signals of the output voltage, the load regulation correcting signals are DC voltages that are approximately proportionate to the amount of output current, so load regulation correction of the detecting signals of the output voltage can be performed easily and precisely.

Further, with arrangements wherein the temperature compensating circuit is introduced in the conducting path of the load regulation correcting signals of the load regulation correcting circuit, with the temperature compensating circuit having a configuration wherein the resistance values which the entire circuit has change according to the ambient temperature, so as to perform temperature compensation of load regulation correcting signals, or with arrangements wherein a serial connecting portion of resistors is connected in parallel with the output side of the primary-side rectification smoothing circuit, and the temperature compensating circuit changes the detecting signals of the output voltage applied from the primary-side rectification smoothing circuit to the control circuit by changing the voltage dividing ratio of the serial connection portion of the resistors according to the fluctuations in the ambient temperature, thereby performing temperature compensation of load regulation correcting signals, precise temperature compensation can be made for the amount of load regulation correcting signals with a simple circuit configuration.

With the use of the unique configuration according to preferred embodiments of the present invention, fluctuations in the inclination of load regulation properties due to fluctuations in the ambient temperature are minimized. Accordingly, constant load regulation properties can be achieved, regardless of changes in the ambient temperature. Accordingly, in the event of building a multi-parallel type switching electric power source device by disposing multiple switching electric power source devices, the load regulation properties of the switching electric power source devices can be maintained in a state wherein current balance is readily achieved, even in the event that the ambient temperature fluctuates.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. An insulating-type switching electric power source device, comprising:

a transformer having a primary side and a secondary side;

a switch device provided at the primary side of said transformer and converting input voltage of the primary side of said transformer to output voltage of the secondary side of said transformer;

a primary side rectification smoothing circuit provided at the primary side of said transformer and performing rectification smoothing of the voltage of a coil of said transformer;

a control circuit for using said voltage subjected to rectification smoothing as detection signals of output voltage, and controlling the time ratio of said switch device so as to stabilize said output voltage;

a load regulation correcting circuit detecting current correlated with output current by a current detecting device provided in a circuit at the primary side, the load regulation correcting circuit generating load regulation correcting signals having a correlation with said output current from the detected current and correcting detection signals of said output voltage, according to output voltage fluctuations due to output current fluctuations; and a temperature compensating circuit for changing the amount of load regulation correction by said load regulation correcting circuit according to the fluctuations in the ambient temperature, so as to reduce the amount of load regulation correction under low-temperature environments, and to increase the amount of load regulation correction under high-temperature environments.

2. An insulating-type switching electric power source device according to claim 1, further comprising a secondary-side rectification smoothing circuit for performing rectification smoothing of the voltage of a secondary coil of said transformer, wherein said secondary-side rectification smoothing circuit includes a MOS-FET which is a synchronous rectifier.

3. An insulating-type switching electric power source device according to claim 1, wherein said load regulation correcting circuit includes:

a switching current detecting device detecting switching current and defining said current detecting device; and a capacitor to which the voltage of said switching current detecting device is peak-charged;

whereby said load regulation correcting circuit outputs the charged voltage of said capacitor as load regulation correcting signals.

4. An insulating-type switching electric power source device according to claim 1, wherein said temperature compensating circuit includes:

a serial resistor connection unit including a plurality of resistors introduced in a conducting path of said load regulation correcting circuit for generating load regulation correcting signals; and a temperature sensing unit connected in parallel to a position where a divided voltage of said serial resistor connection unit is applied;

wherein said temperature sensing unit is configured such that equivalent resistance values change due to fluctuations in ambient temperature, thereby changing the resistance values of said temperature compensating circuit, thus performing temperature compensation for the load regulation correcting signals passing through said temperature compensating circuit.

5. An insulating-type switching electric power source device according to claim 1, further comprising:

a serial connection unit including a plurality of resistors connected to the output side of said primary-side rectification smoothing circuit, and the divided output voltage from said serial connection unit is output to said control circuit as detection signals of the output voltage of said switching electric power source device;

wherein said temperature compensating circuit includes:

a temperature compensating current channel for supplying current to a voltage dividing position which differs from the detection signal output unit at said serial connection unit of said resistors; and a temperature sensing unit which is introduced into said temperature compensating current channel and which varies the amount of conduction on said temperature compensating current channel according to fluctuations in the ambient temperature;

said temperature compensating circuit changes detecting signals applied to said control circuit from said primary-side rectification smoothing circuit according to temperature change, by fluctuating the amount of current supplied to the serial connecting unit of said resistors from said temperature compensating current channel with said temperature sensing unit so as to change the voltage dividing ratio of said serial connecting unit of said resistors, thereby performing temperature compensation for load regulation correction.

6. A switching electric power source device, comprising a plurality of insulating-type switching electric power source devices according to claim 1, wherein the input and output of each of said plurality of insulating-type switching electric power source devices are connected in parallel.

* * * * *